(12) United States Patent
Stanic et al.

(10) Patent No.: US 10,688,883 B2
(45) Date of Patent: Jun. 23, 2020

(54) ACTUATOR FOR A MOTOR VEHICLE, IN PARTICULAR FOR A MOTOR VEHICLE SEAT

(71) Applicant: JOHNSON CONTROLS METALS AND MECHANISMS GMBH & CO. KG, Solingen (DE)

(72) Inventors: Ivica Stanic, Dormagen (DE); Andreas Hoffmann, Wülfrath (DE)

(*) Notice: Subject to any disclaimer, the term of this patent is extended or adjusted under 35 U.S.C. 154(b) by 441 days.

(21) Appl. No.: 15/115,102

(22) PCT Filed: Jan. 26, 2015

(86) PCT No.: PCT/EP2015/051467
§ 371 (c)(1),
(2) Date: Jul. 28, 2016

(87) PCT Pub. No.: WO2015/113929
PCT Pub. Date: Aug. 6, 2015

(65) Prior Publication Data
US 2017/0008423 A1    Jan. 12, 2017

(30) Foreign Application Priority Data
Jan. 31, 2014   (DE) .................. 10 2014 201 742

(51) Int. Cl.
*F16H 57/021*    (2012.01)
*B60N 2/02*    (2006.01)
(Continued)

(52) U.S. Cl.
CPC .......... *B60N 2/0232* (2013.01); *B60N 2/929* (2018.02); *F16H 25/20* (2013.01);
(Continued)

(58) Field of Classification Search
CPC .............. F16H 25/20; F16H 2025/209; F16H 2025/2031; F16H 25/2015; F16H 57/021;
(Continued)

(56) References Cited

U.S. PATENT DOCUMENTS 4,802,374 A * 2/1989 Hamelin .............. B60N 2/0232
248/429
7,775,131 B2 * 8/2010 Becker ................. B60N 2/0232
74/606 R
(Continued)

FOREIGN PATENT DOCUMENTS

CH           647 305 A5    1/1985
CN       101 272 929 A    9/2008
(Continued)

*Primary Examiner* — Victor L MacArthur
*Assistant Examiner* — Randell J Krug (57) ABSTRACT

An actuator (10, 210) for a motor vehicle, in particular a motor vehicle seat, includes an electric motor (20) that is equipped with an output shaft (24) and a gear mechanism (100, 200) that is connected to the output shaft (24). The gear mechanism (100, 200) is provided with a gear mechanism housing (120, 220). A gear mechanism retaining device (160, 260) supports the gear mechanism housing (120, 220) in such a way that the housing can swivel about a swivel axis (165, 265). A shaft section (126, 226) of the gear mechanism housing (120, 220) that is flush with the swivel axis (165, 265) is surrounded at least in part by a retaining bracket (170, 270) of the gear mechanism retaining device (160, 260). The output shaft (24) is located outside the retaining bracket (170, 270).

20 Claims, 12 Drawing Sheets

(51) Int. Cl.
*B60N 2/90* (2018.01)
*F16H 25/20* (2006.01)
*F16H 57/025* (2012.01)

(52) U.S. Cl.
CPC ...... *B60N 2002/024* (2013.01); *F16H 57/021* (2013.01); *F16H 57/025* (2013.01); *F16H 2025/209* (2013.01); *F16H 2025/2031* (2013.01)

(58) Field of Classification Search
CPC . F16H 57/025; B60N 2/443; B60N 2002/024; B60N 2/0232
See application file for complete search history.

(56) References Cited

U.S. PATENT DOCUMENTS 8,960,628 B2 * 2/2015 Stanic ................. B60N 2/42
248/157

2012/0146379 A1 6/2012 Teer
2014/0102230 A1 * 4/2014 Wingett .............. F16H 25/2015
74/89.34

FOREIGN PATENT DOCUMENTS

| | | | | |
|---|---|---|---|---|
| CN | 101 528 502 A | 9/2009 | | |
| CN | 102 529 751 A | 7/2012 | | |
| DE | 102004063538 A1 | * 7/2006 | ........... | B60N 2/0232 |
| DE | 10 2006 005 499 A1 | 11/2006 | | |
| DE | 10 2005 046356 A1 | 3/2007 | | |
| DE | 10 2008 017 017 A1 | 12/2008 | | |
| DE | 10 2008 050 255 A1 | 4/2010 | | |
| EP | 0 301 461 A2 | 2/1989 | | |
| EP | 2 610 104 A2 | 7/2013 | | |
| JP | H07-47875 A | 2/1995 | | |
| JP | H09-142182 A | 6/1997 | | |
| JP | H10-315808 A | 12/1998 | | |
| JP | H11-334424 A | 12/1999 | | |
| WO | 86/06036 A1 | 10/1986 | | |

* cited by examiner

ACTUATOR FOR A MOTOR VEHICLE, IN PARTICULAR FOR A MOTOR VEHICLE SEAT

CROSS REFERENCE TO RELATED APPLICATIONS

This application is a U.S. National Phase Application of International Application PCT/EP2015/051467 filed Jan. 26, 2015 and claims the benefit of priority under 35 U.S.C. § 119 of German Application 10 2014 201 742.4 filed Jan. 31, 2014, the entire contents of which are incorporated herein by reference.

FIELD OF THE INVENTION

The invention relates to an actuating drive for a motor vehicle, in particular for a motor vehicle seat, having an electric motor which has an output shaft, a gear mechanism which is connected to the output shaft and which has a gear housing, and having a gear retention device which supports the gear housing pivotably about a pivot axis, wherein a shaft portion of the gear housing in alignment with the pivot axis is at least partially surrounded by a curved retention member of the gear retention device.

BACKGROUND OF THE INVENTION

DE 10 2006 005 499 A1 discloses an actuating drive in which a gear retention member completely surrounds a gear housing so that an output shaft of an electric motor is also enclosed by the gear retention member. The gear housing is supported in the gear retention member in a rotatable manner so that fitting imprecisions and tolerances are compensated for by a relative rotation between the gear housing and the gear retention member.

DE 10 2008 017 017 A1 discloses an actuating drive whose gear housing is supported in a retention member, wherein a pivot bearing is provided between the gear housing and the retention member and a support which is opposite the pivot bearing is provided between the gear housing and the retention member. The retention member substantially surrounds the gear housing and an output shaft of an electric motor extends inside the retention member.

CH 647 305 A5 discloses a motor-driven linear thrust device having a connecting rod which can be driven by means of a screw spindle having a nut, wherein both the nut and the screw spindle are rotatably supported individually and have an individual drive. The linear thrust device has a housing which comprises two journals in order to be able to support the linear thrust device in a pivotable manner.

SUMMARY OF THE INVENTION

An object of the invention is to improve an actuating drive of the type mentioned in the introduction, in particular to provide a cost-effective gear retention device which is optimized in terms of structural space.

This object is achieved according to the invention by an actuating drive having an electric motor which has an output shaft, a gear mechanism which is connected to the output shaft and which has a gear housing, and having a gear retention device which supports the gear housing pivotably about a pivot axis, wherein a shaft portion of the gear housing in alignment with the pivot axis is at least partially surrounded by a curved retention member of the gear retention device. According to the invention, the output shaft is arranged outside the curved retention member.

In that the output shaft is arranged outside the curved retention member, the curved retention member does not completely surround the gear housing so that structural space for the curved retention member is not required at the side of the output shaft facing away from the curved retention member. There is thereby provided a cost-effective gear retention device which is optimized in terms of structural space.

Advantageous embodiments which can be used individually or in combination with each other are set out in the dependent claims.

The gear retention device can be used in all actuating drives which are known per se and in which a pivot movement between the gear retention device and the gear mechanism is advantageous. There may also be used electric motors which have an integrated or fitted reduction gear and which are connected to an additional gear mechanism. In this instance, the term "output shaft of the electric motor" is intended to be understood to refer to an output shaft of the integrated or fitted reduction gear. The actuating drive advantageously has precisely one electric motor.

It is particularly advantageous to have an actuating drive according to the invention having a spindle nut which can be driven at least indirectly by the output shaft and which is rotatably supported in the gear housing, and wherein the spindle nut cooperates with a spindle in such a manner that a rotation of the spindle nut results in a relative displacement between the spindle and the gear housing. The moving spindle can actuate, for example, a seat adjuster or a window lifting mechanism in a motor vehicle.

It is possible to achieve a spindle length which is minimized for a predetermined adjustment range of the actuating drive and a more pleasant end stop noise by there being provided in at least one end region of the spindle a spindle stop which projects radially from the spindle and which abuts an end face of the spindle nut in an end position of the adjustment range of the actuating drive and thereby defines the end position.

A spindle stop having a portion which comprises plastics material or rubber and which abuts the end face of the spindle nut further improves the stop noise behavior of the actuating drive.

A gear retention device which is particularly optimized in terms of structural space can be obtained by the shaft portion at least partially adjoining a through-opening of the gear housing or projecting into a through-opening of the gear housing, and the curved retention member extending through that through-opening. The curved retention member can thus surround and support the shaft portion or form at least a portion of a bearing location.

The shaft portion and with it the pivot axis of the gear retention device are preferably arranged so as to be offset in a radial direction relative to the output shaft. The output shaft can thereby be arranged in a space-saving manner outside the curved retention member. The pivot axis and the output shaft preferably extend in a mutually parallel but offset manner.

The curved retention member preferably comprises precisely two U-shaped curved members each having a first bearing shell which form two peripheral hubs for supporting two shaft portions together with a second bearing shell of a closure member. In this instance, the closure member closes the curved retention member in such a manner that each shaft portion is completely surrounded in the peripheral direction thereof by the gear retention device.

The gear retention device may have one, two or more bearing locations for the gear mechanism. The curved retention member comprises a first bearing shell for each of the bearing locations. A plurality of first bearing locations can also merge one in the other. The closure member comprises a second bearing shell for each of the bearing locations. A first bearing shell and the second bearing shell complement each other to form a hub which supports the respective shaft portion by the angular ranges of the two bearing shells complementing each other to form a peripheral cylinder. For example, the first bearing shell and the second bearing shell are constructed as half-cylinders which surround the pivot axis through 180°, respectively.

A particularly simple assembly of the gear retention device on the shaft portions of the gear housing can be achieved by the closure member being connected to the curved retention member by means of a clip-fit connection. In this instance, resilient arms having projections are preferably formed on the closure member. The projections spring back during the assembly of the gear retention device in recesses of the curved retention member and thus ensure a positive-locking connection counter to the joining direction which is advantageously substantially parallel with the spindle.

The closure member can alternatively, or additionally to the clip-fit connection, be connected to the curved retention member in a positive-locking manner in a direction parallel with the pivot axis. To this end, at least one insertion profile of the curved retention member can engage in a complementarily formed closure member opening.

In order to connect the actuating drive to an additional component, for example, a seat structure, the gear retention device has at least one opening for the introduction of a fixing means, in particular a screw or a rivet. A center axis of the fixing means orientated in the longitudinal direction of the fixing means preferably extends parallel with the spindle. The fixing means is thereby loaded to a comparatively small extent. In contrast to the actuating devices known from the prior art, the gear retention device and the fixing means are loaded with respect to pressure to a lesser extent.

The shaft portions can also be constructed as journals which project laterally from the gear housing. The shaft portions can be constructed integrally with the gear housing, for example, injection molded, or be fixed to the gear housing.

The actuating drive according to the invention provides optimization of the stability with respect to the prior art, whereby the noise behavior, the degree of efficiency and the wear resistance are optimized.

The invention is explained in greater detail below with reference to two advantageous embodiments which are illustrated in the figures. However, the invention is not limited to those embodiments. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Referring to the drawings, FIGS. 1 to 9 illustrate a first embodiment of an actuating drive 10 for a motor vehicle, in particular for a motor vehicle seat. The actuating drive 10 comprises an electric motor 20, a gear mechanism 100 connected to the electric motor 20 and a gear retention device 160.

The electric motor 20 comprises an output shaft 24 which is connected in a rotationally secure manner to an endless screw 130 of the gear mechanism 100. The endless screw 130 is in engagement with a spindle nut 140. The spindle nut 140 is part of the gear mechanism 100 and is in engagement with a spindle 150 in a manner known per se.

The gear mechanism 100 comprises a gear housing 120 which receives the endless screw 130 and the spindle nut 140 therein. To this end, the gear housing 120 has a substantially cylindrical region for receiving the endless screw 130 and an additional, substantially cylindrical region for receiving the spindle nut 140, which region is orientated in the direction of the spindle 150 and perpendicularly to the cylindrical receiving region for the endless screw 130.

The gear retention device 160 supports the gear housing 120 pivotably about a pivot axis 165. The gear retention device 160 may be fixed, for example, to a vehicle seat structure of the motor vehicle seat.

The spindle 150 extends through the gear housing 120. To this end, the gear housing 120 has a first housing opening 121 and a second housing opening 122, through which the spindle 150 extends. A bearing bush 128 for supporting a first of two ends of the spindle nut 140 is inserted into the second housing opening 122. A second end of the spindle nut 140 is supported directly in the gear housing 120. The spindle 150 also extends through the bearing bush 128.

The gear housing 120 has two through-openings 124. When viewed in the direction of the pivot axis 165, beside the second housing opening 122, the substantially cylindrical region of the gear housing 120 which receives the spindle nut 140 is widened in two diametrically opposing regions and provided with a through-opening 124. The two through-openings 124 are slot-like, wherein the longitudinal axes of the slots extending in the direction of the greatest clear width of the through-openings 124 extend parallel with a center axis of the spindle 150.

In a region of the through-opening 124 facing away from the endless screw 130, the gear housing 120 and the inner walls of the through-openings 124 are formed in such a manner that each through-opening 124 is delimited by a shaft portion 126 having a circular cross-section. The two shaft portions 126 define the pivot axis 165, about which the gear housing 120 can be pivoted relative to the gear retention device 160. Fitting imprecisions and tolerances within the actuating drive 10 and/or positional tolerances of the actuating drive 10 can thereby be compensated for relative to a component which is intended to be driven. Many components which are intended to be driven, such as, for example, four-bar height adjusters, may further require in principle that the actuating drive 10 has a limited ability to rotate.

The gear retention device 160 comprises a curved retention member 170 and a closure member 180 which are connected, in this case clip-fitted, to each other, and which receive the two shaft portions 126 of the gear housing 120 in a supporting manner between them. During the assembly process, the spindle nut 140 and subsequently the bearing bush 128 are introduced through the second housing opening 122 into the gear housing 120. Subsequently, the gear retention device 160 can be fitted to the gear housing 120.

Figure 7:
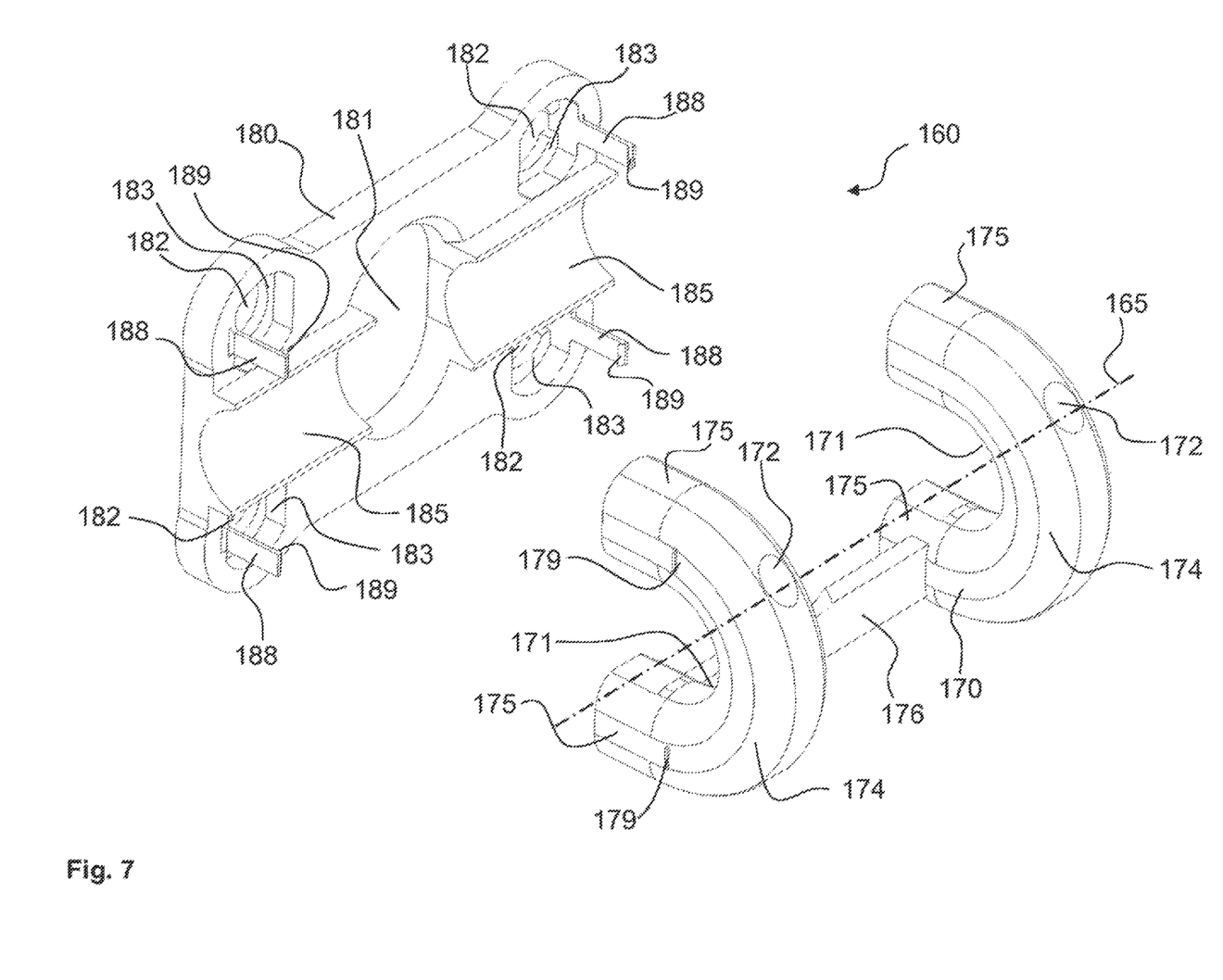
FIG. 7 is an exploded view of the gear retention device from FIG. 1.
Figure 8:
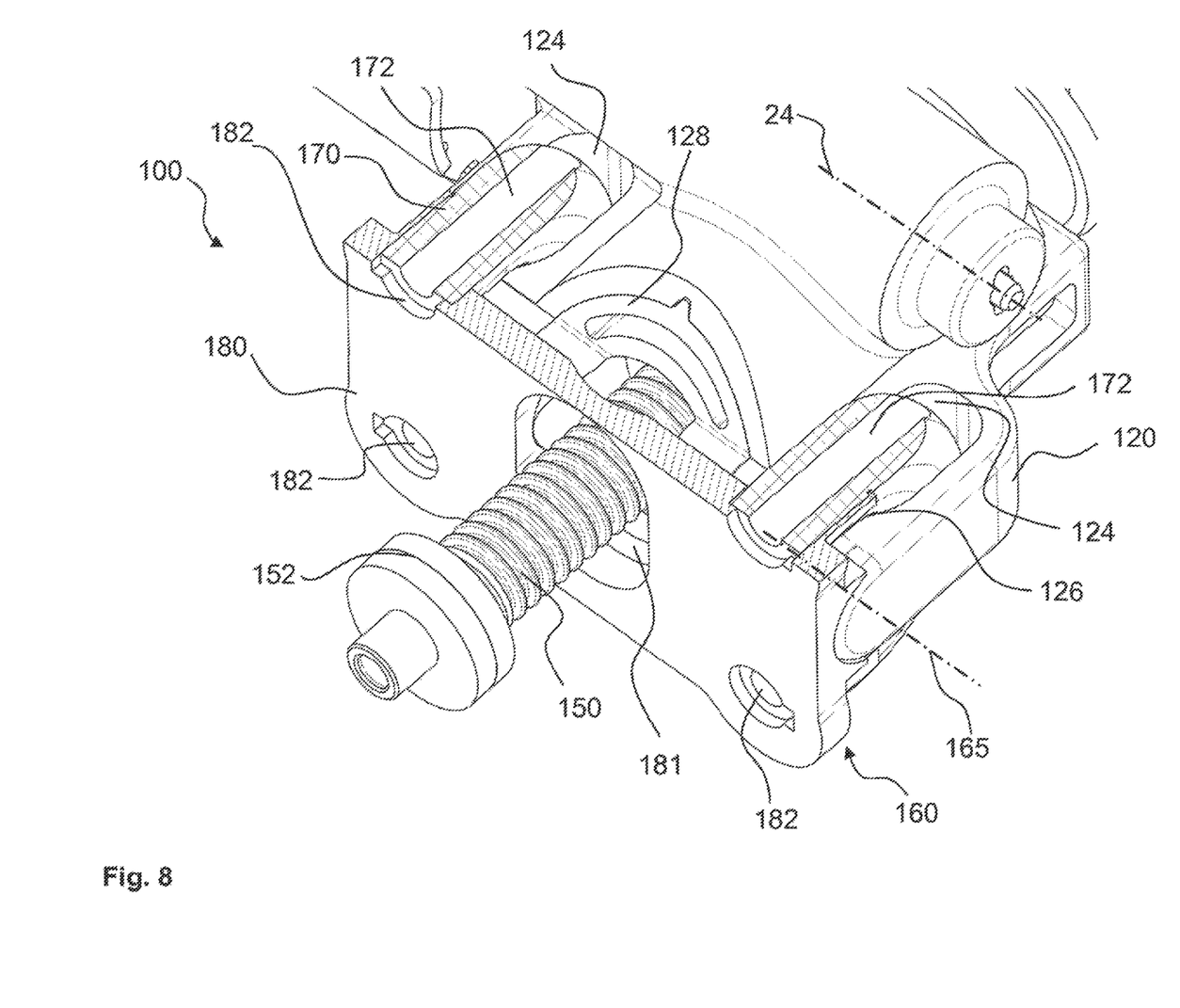
FIG. 8 is a sectioned view of the actuating drive from FIG. 1 in the region of the gear retention device.
Figure 9:
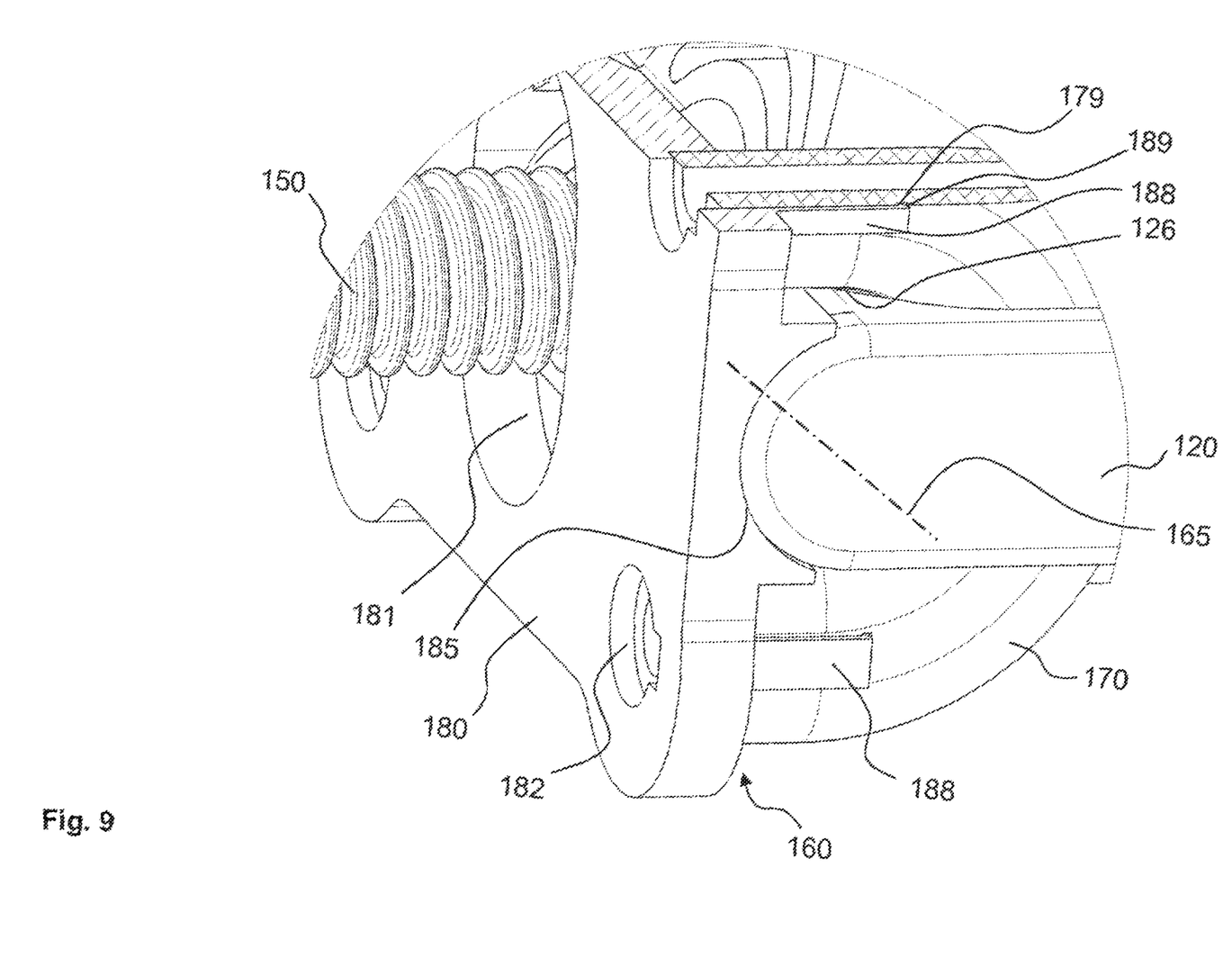
FIG. 9 is a sectioned view similar to FIG. 8.

The curved retention member 170 comprises two U-shaped curved members 174 which are arranged so as to be offset relative to each other in the direction of the pivot axis 165 and which are connected to each other by means of a web 176. Each of the two U-shaped curved members 174 comprises a profiled portion which is curved in a semi-circular manner and each of the two ends of which a linear insertion profile 175 adjoins. A first bearing shell 171 which extends over an angle of approximately 180° in a semi-cylindrical manner about the pivot axis 165 is formed in the inner periphery of the profiled portion which is curved in a semi-circular manner.

Each of the two U-shaped curved members 174 has two curved retention member openings 172 which extend parallel with the spindle 150. The outer sides of the two U-shaped curved members 174 each have a notch-like recess 179 which is a component of a clip-fit connection described in greater detail below.

The closure member 180 has a substantially planar, rectangular basic geometry, through the center of which a first closure member opening 181 extends. The first closure member opening 181 is constructed in a slot-like manner, wherein the longitudinal axis of the slot extends perpendicularly to the pivot axis 165 and acts as a through-hole for the spindle 150, which longitudinal axis extends in the direction of the largest clear width of the first closure member opening 181.

A second closure member opening 182 is arranged in the four corner regions of the closure member 180, respectively. In the direction of the material thickness of the closure member 180, at least one, in this instance every other, closure member opening 182 is subdivided by a step-like shoulder 183 into two portions. A first portion is facing the pivot axis 165 and has a cross-section which is complementary to the insertion profile 175 of the U-shaped curved member 174. A second portion of the second closure member opening 182 facing away from the pivot axis 165 has a diameter which is smaller than the largest extent of the cross-section of the insertion profile 175.

Two semi-cylindrical second bearing shells 185 extend in the direction of the pivot axis 165 and form together with one of the first bearing shells 171 of the curved retention member 170 a peripheral hub which supports one of the two shaft portions 126 rotatably therein.

A resilient arm 188, which extends perpendicularly to the planar basic geometry of the closure member 180 and in the direction of the curved retention member 170, is arranged in the four corner regions of the closure member 180. A projection 189 is attached to the self-supporting end of each resilient arm 188. The projections 189 engage in the recesses 179 of the curved retention member 170 so that the previously mentioned clip-fit connection which is known per se and which comprises the resilient arm 188, projection 189 and recess 179 is provided.

The insertion profiles 175 of the curved retention member 170 are inserted in the second closure member openings 182 of the closure member 180 so that the closure member 180 is connected to the curved retention member 170 in a positive-locking manner in a direction parallel with the pivot axis 165.

The second closure member openings 182 are each aligned with one of the curved retention member openings 172. Fixing means, in particular screws, which are not illustrated in the figures extend through the curved retention member openings 172 and the second closure member openings 182, serve to fix the gear retention device 160 and further secure the connection, in the assembled state, between the curved retention member 170 and the closure member 180 of the gear retention device 160. The center axes of the fixing means extend parallel with each other and substantially parallel with the spindle 150.

The output shaft 24 is arranged completely outside the gear retention device 160.

Figure 1:
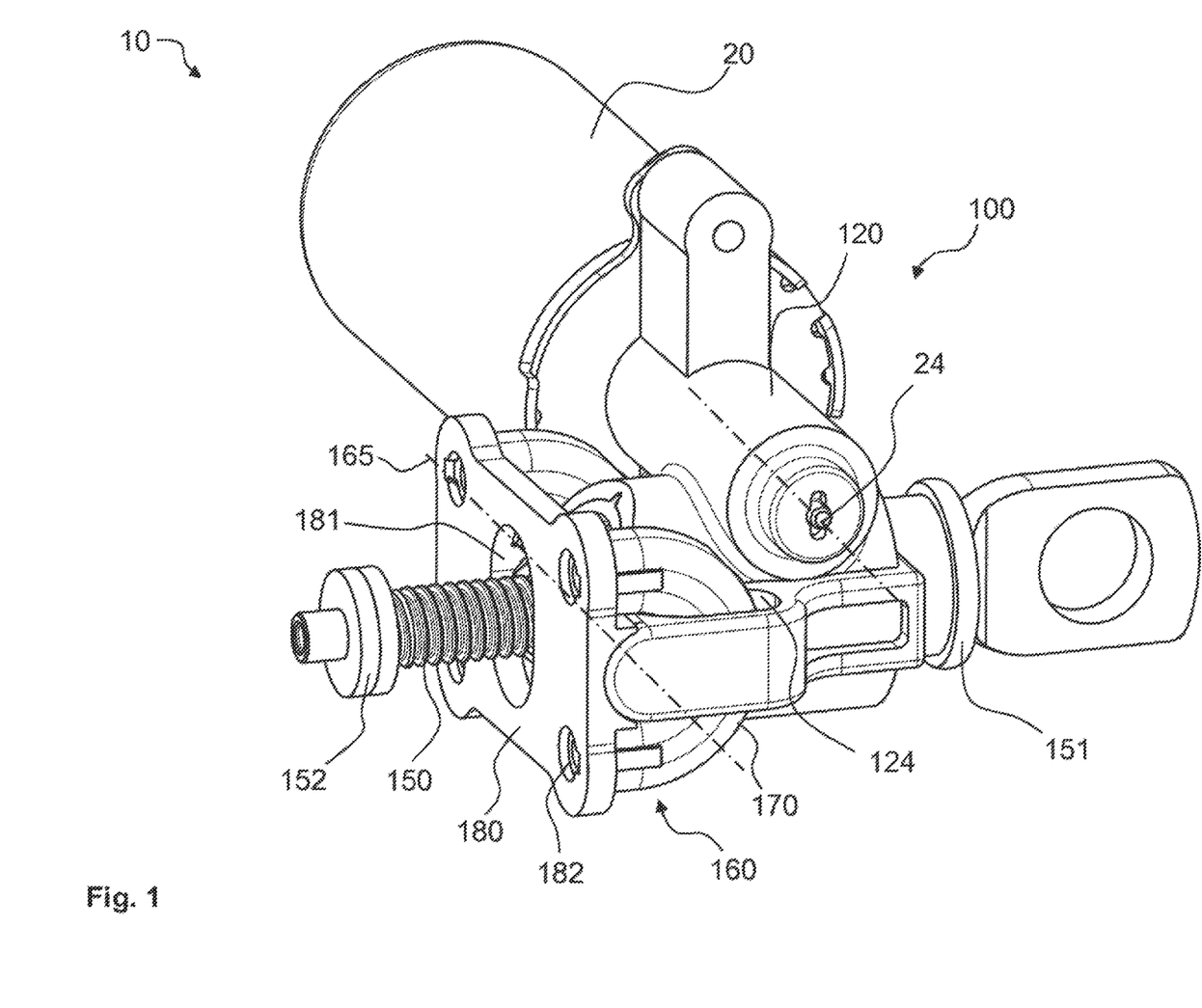
FIG. 1 is a perspective view of a first embodiment of an actuating drive according to the invention in a first end position of the spindle.
Figure 2:
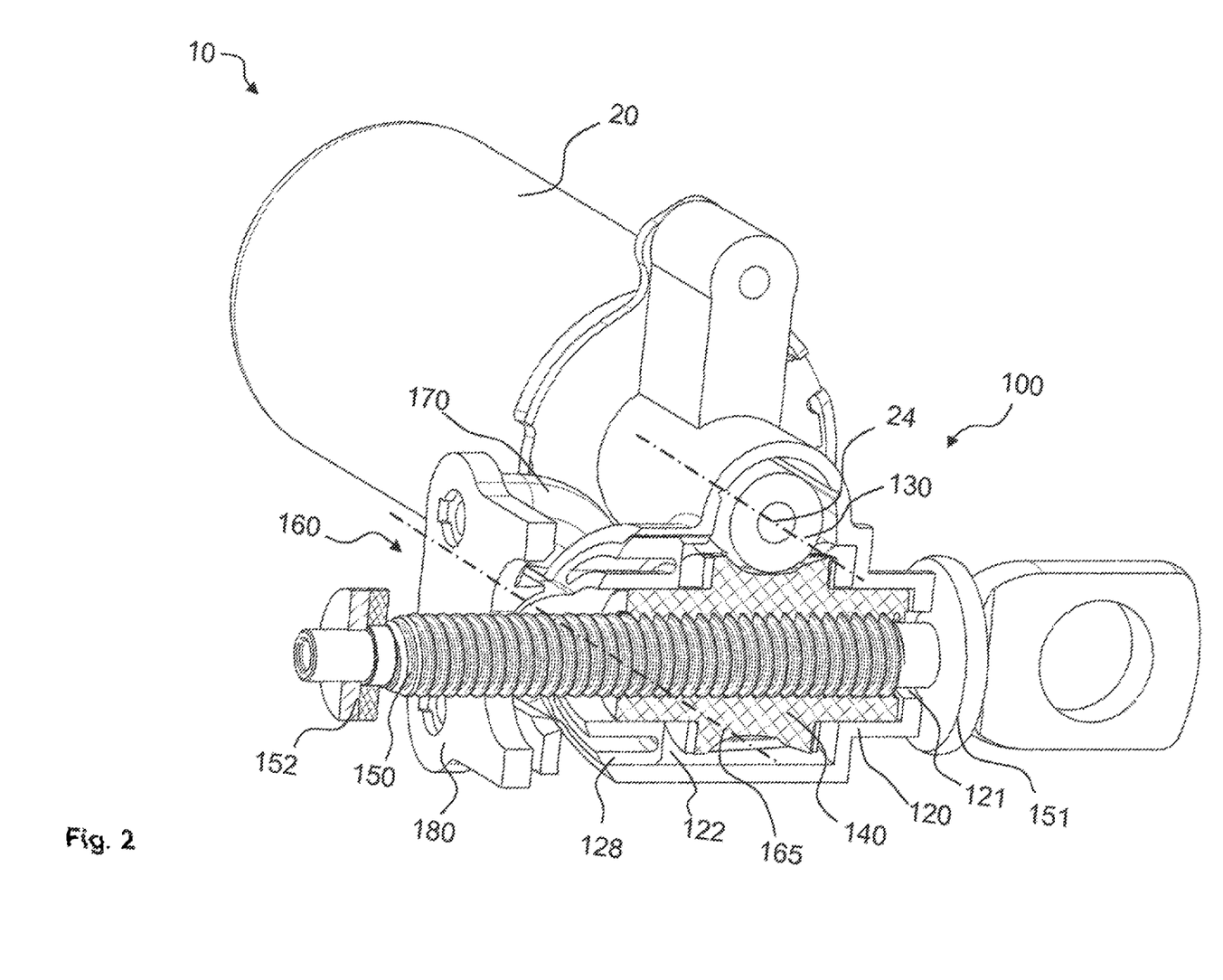
FIG. 2 is a view corresponding to FIG. 1 with a partially sectioned gear housing.
Figure 3:
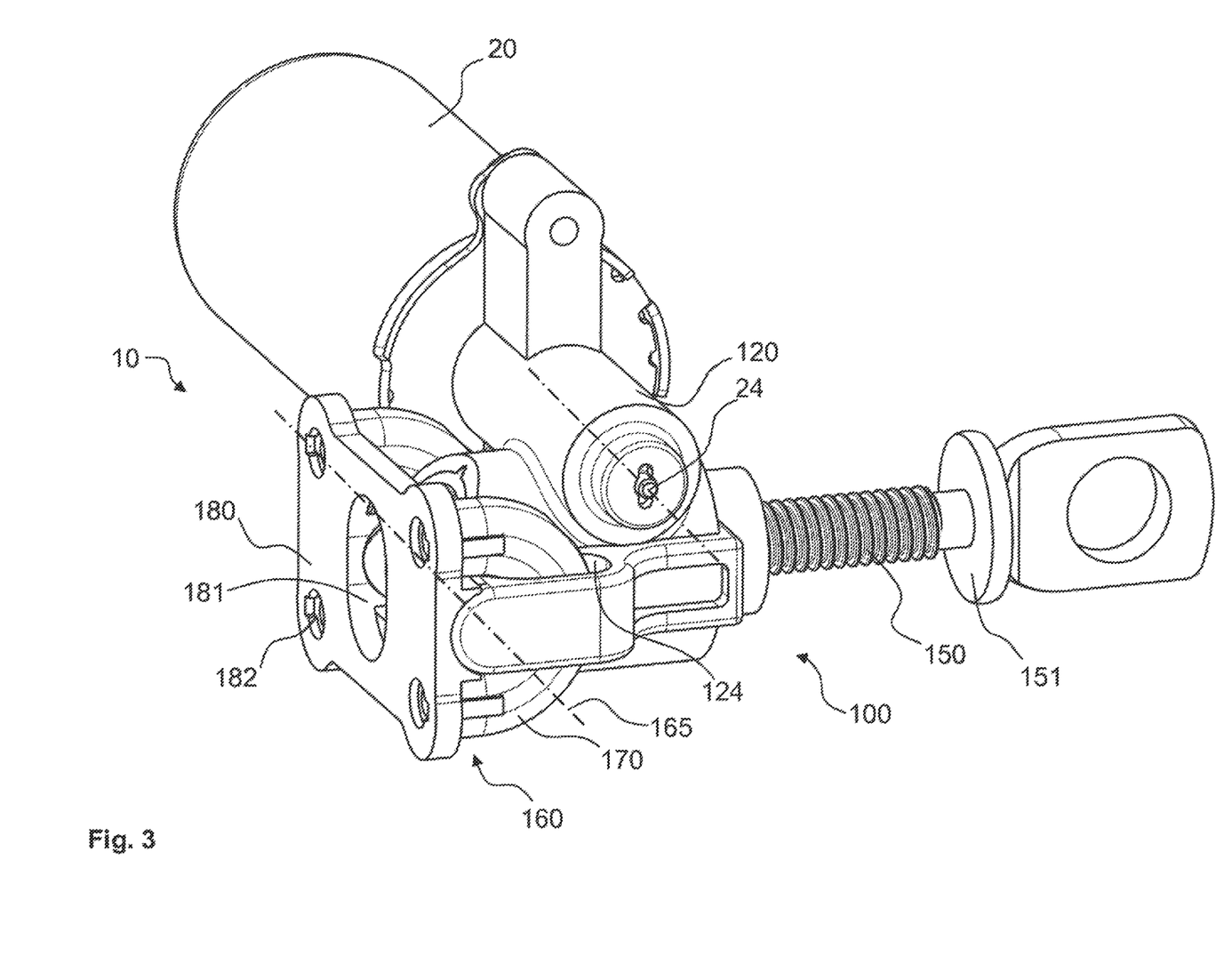
FIG. 3 is a perspective view of the actuating drive from FIG. 1 in a second end position of the spindle.
Figure 4:
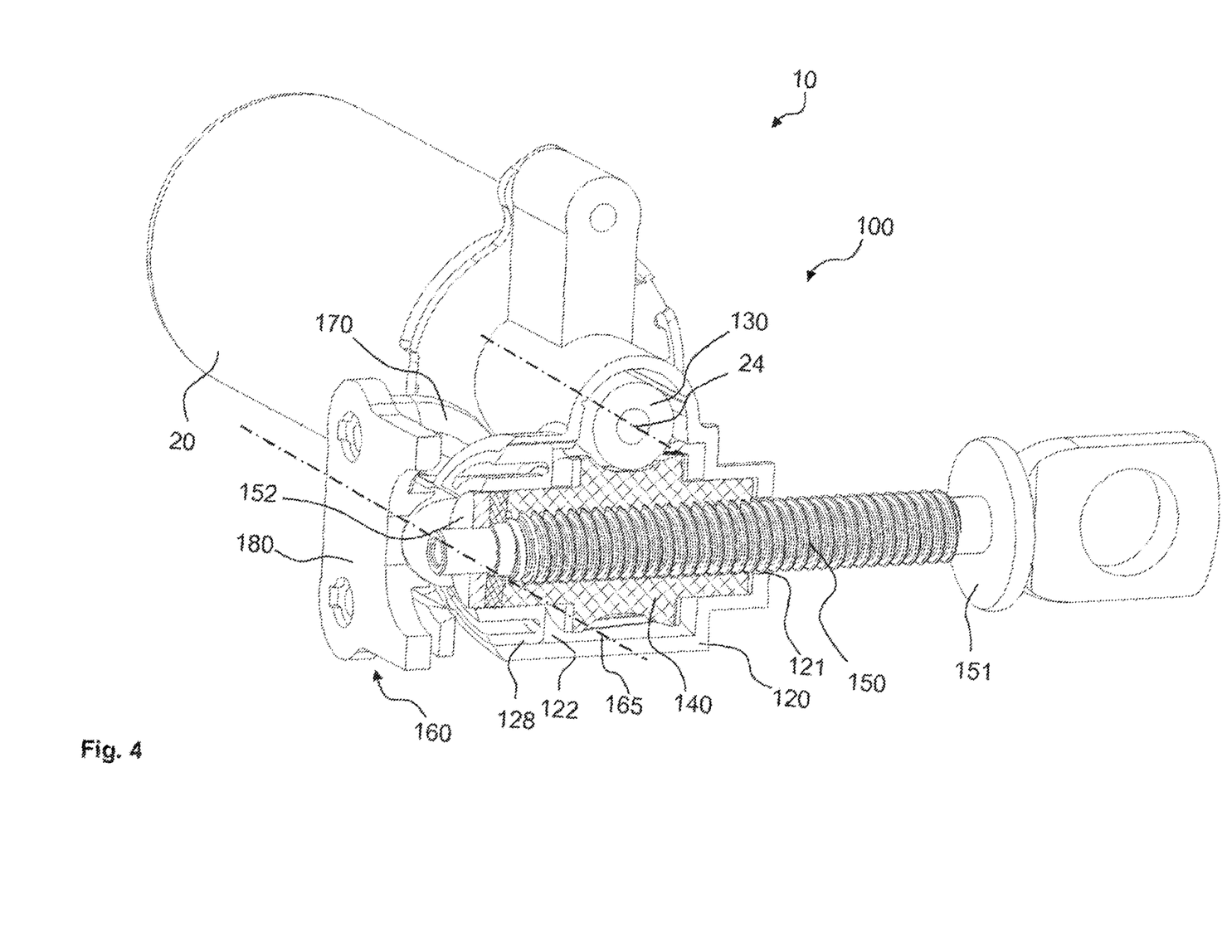
FIG. 4 is a view corresponding to FIG. 3 with a partially sectioned gear housing.
Figure 5:
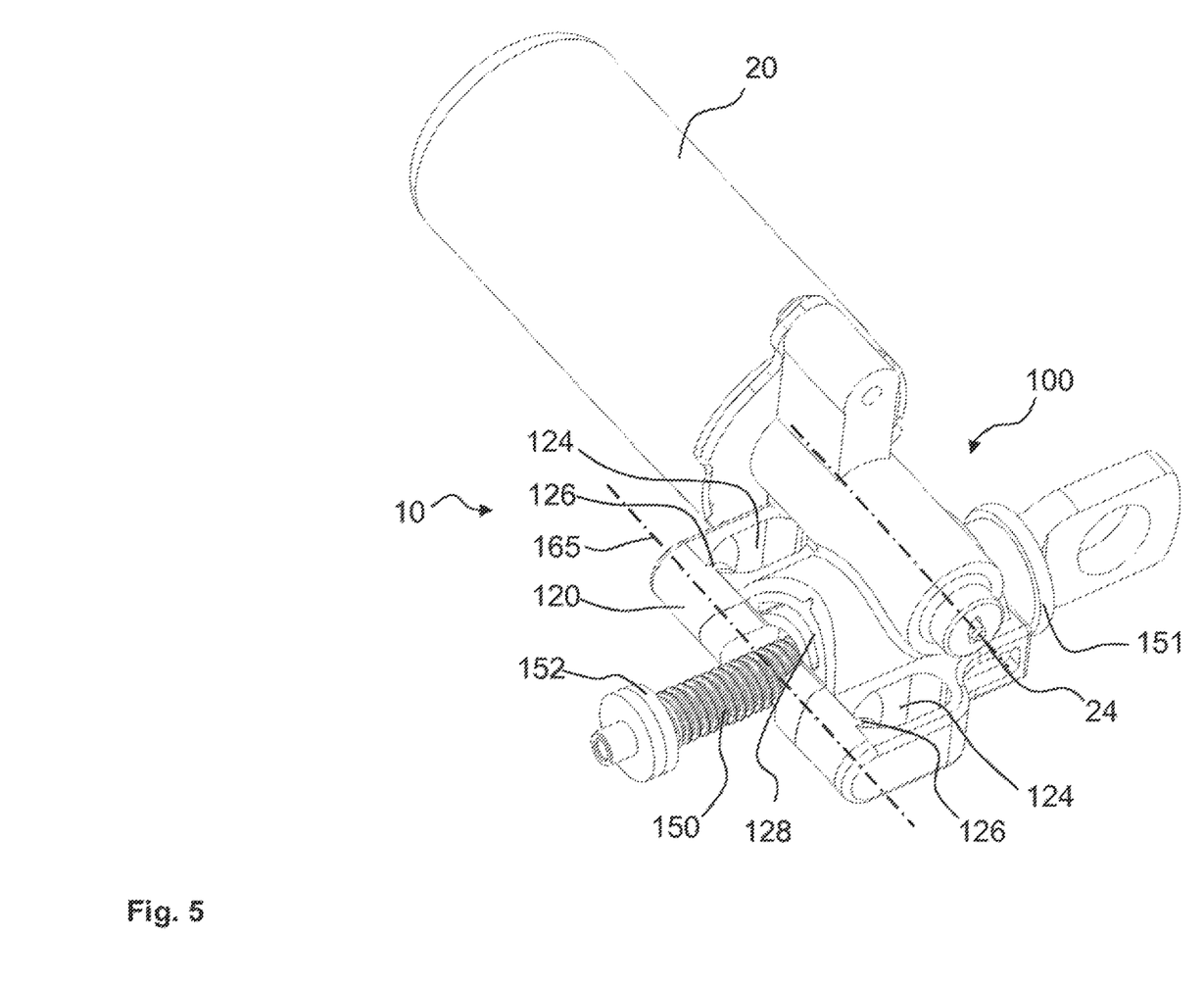
FIG. 5 is a perspective view of the actuating drive from FIG. 1 without a gear retention device.
Figure 6:
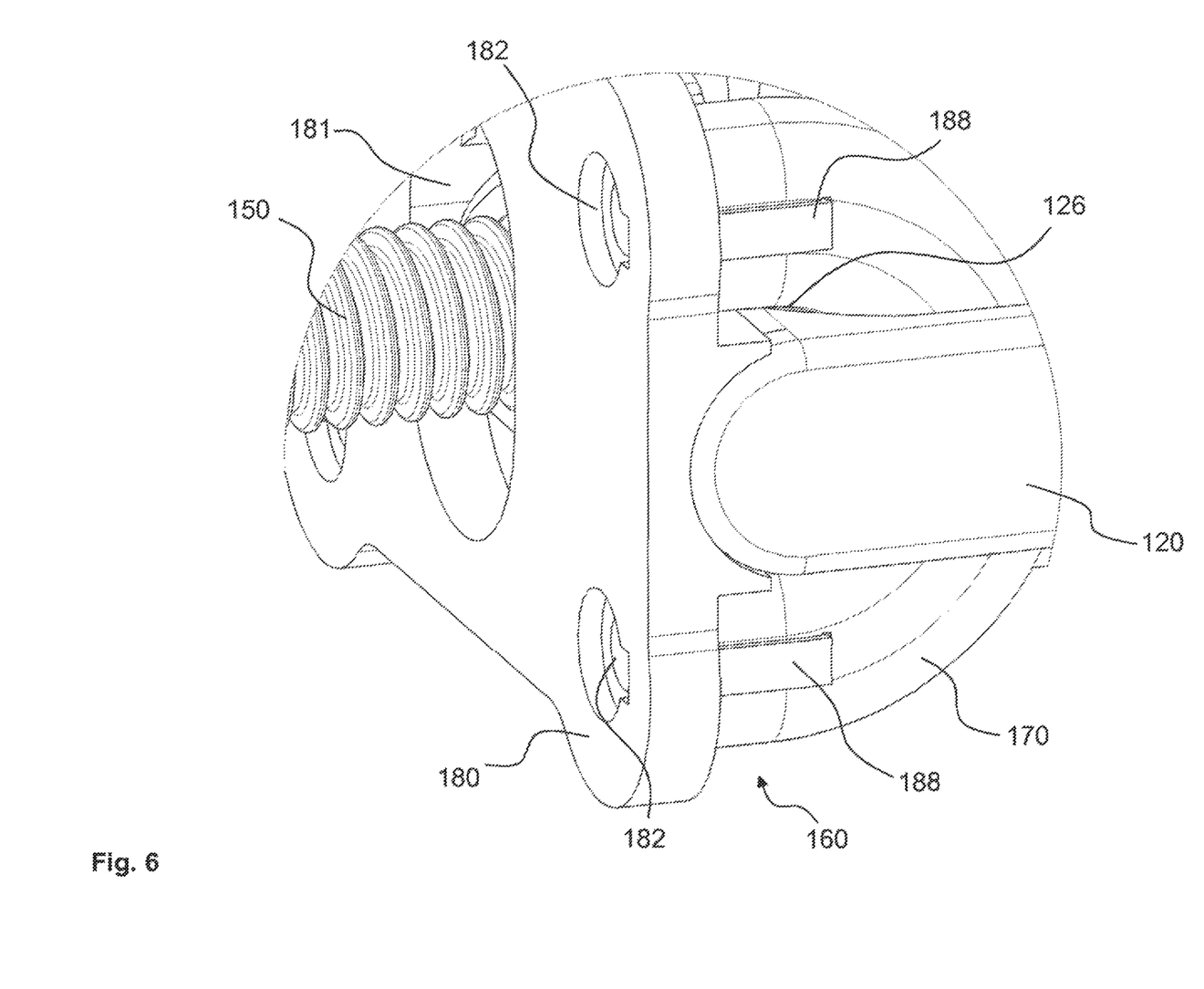
FIG. 6 is a detailed view from FIG. 1 of the region of the gear retention device.

The actuating drive 10 can be adjusted between a first end position of the spindle 150 and a second end position of the spindle 150. The end positions are defined by stops.

The first end position is reached when a first spindle stop 151 which is fixedly connected to the spindle 150 moves from the outer side against a region of the gear housing 120 surrounding the first housing opening 121. The second end position is reached in the opposite direction when a second spindle stop 152 which is fixedly connected to the spindle 150 has traveled through the first closure member opening 181 and the bearing bush 128 and moves against an end face of the spindle nut 140 facing the second spindle stop 152.

The first spindle stop 151 is a circular disk whose outer diameter is greater than the inner diameter of the first housing opening 121.

The second spindle stop 152 is a circular disk whose outer diameter is smaller than the inner diameter of the second housing opening 122, smaller than the inner diameter of the first closure member opening 181 and slightly smaller than the inner diameter of the bearing bush 128. The second spindle stop 152 can thereby travel through the first closure member opening 181 and the bearing bush 128 and does not move against one of those components. This reduces the necessary length of the spindle 150.

In this instance, the second spindle stop 152 comprises different material in two disk-like portions. A region facing the spindle nut 140 comprises a plastics material or rubber material. A region facing away from the spindle nut 140 comprises a metal material, in particular steel.

Figure 10:
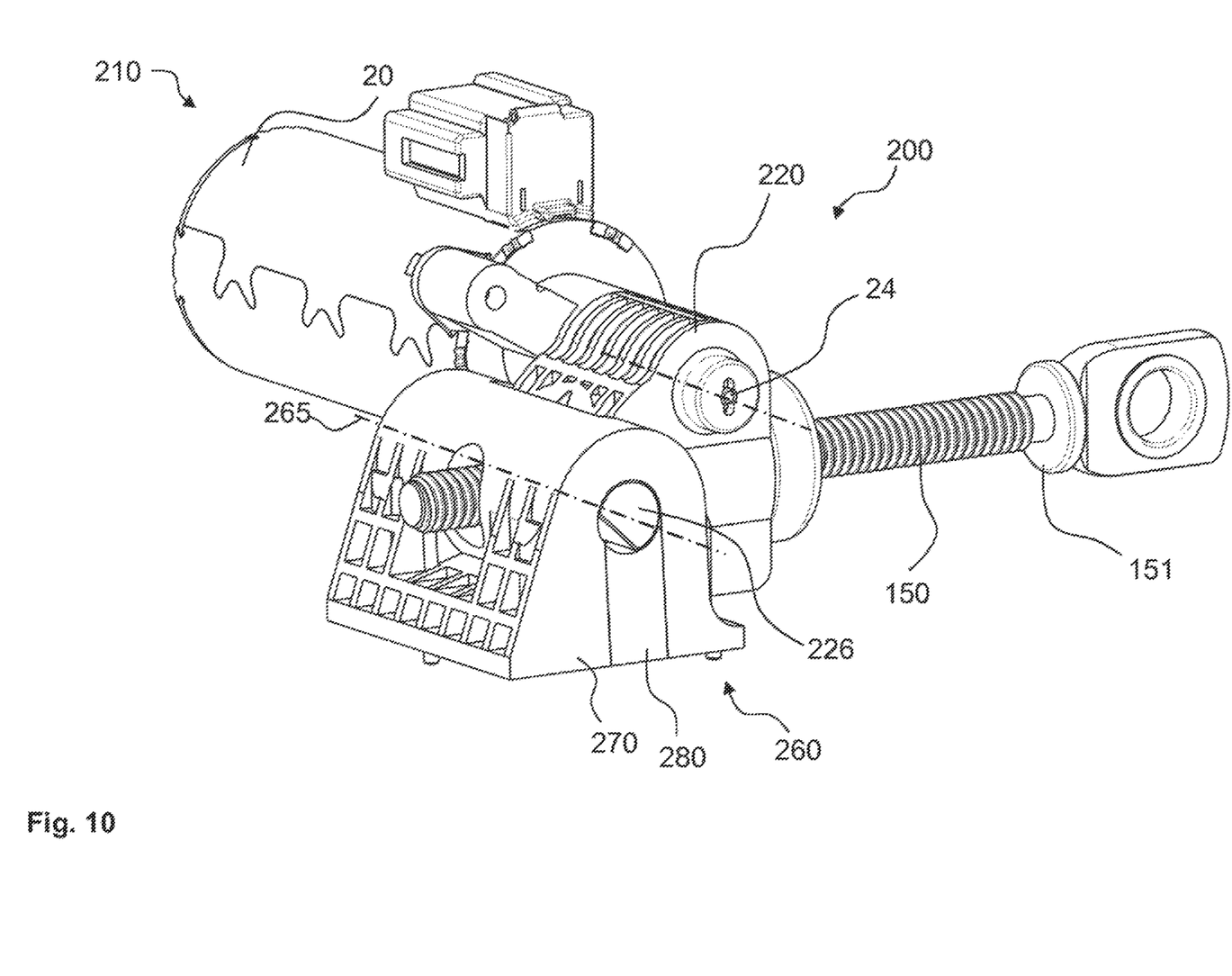
FIG. 10 is a perspective view of a second embodiment of an actuating drive according to the invention.
Figure 11:
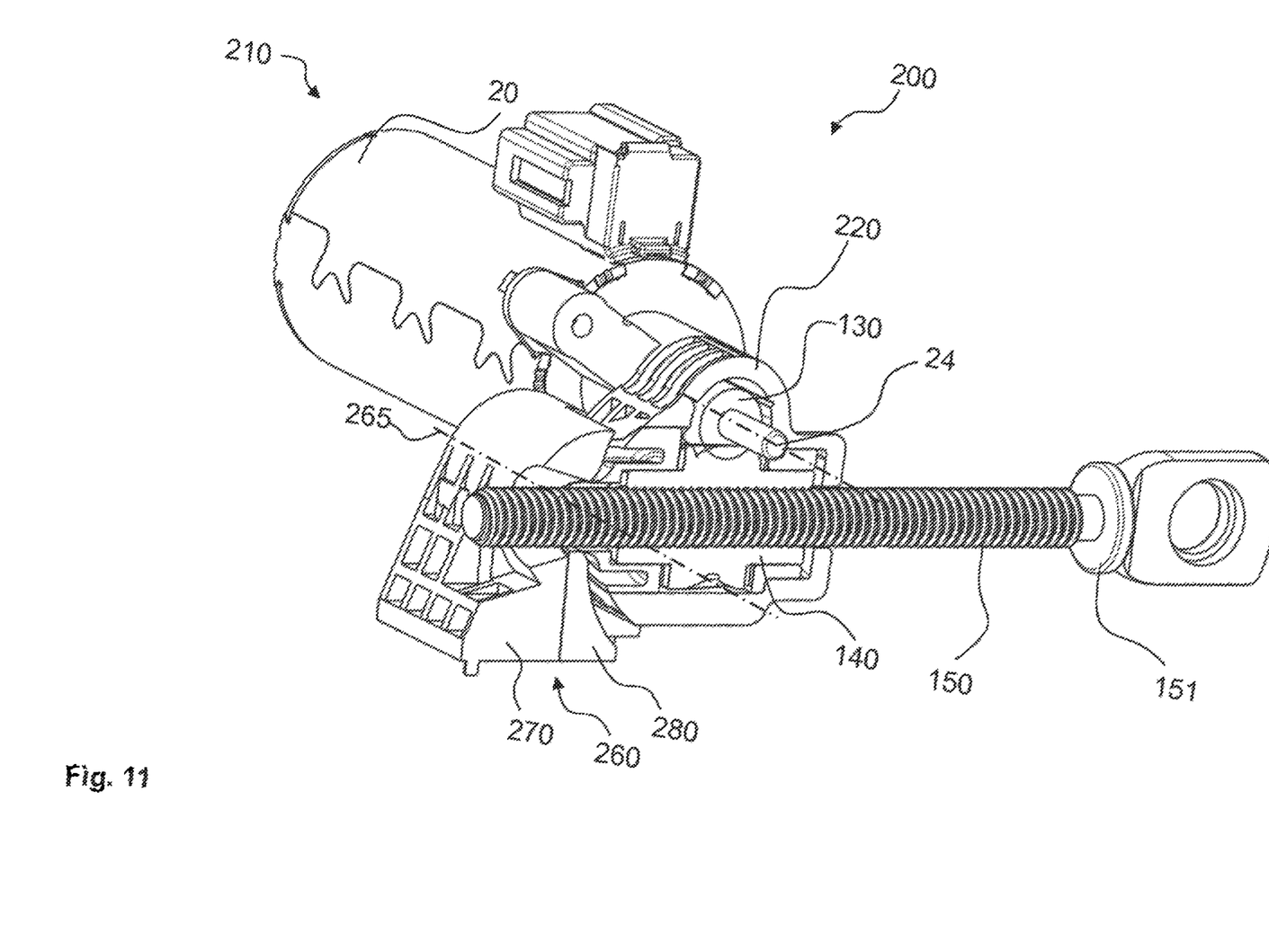
FIG. 11 is a view corresponding to FIG. 10 with a partially sectioned gear housing of the second embodiment.
Figure 12:
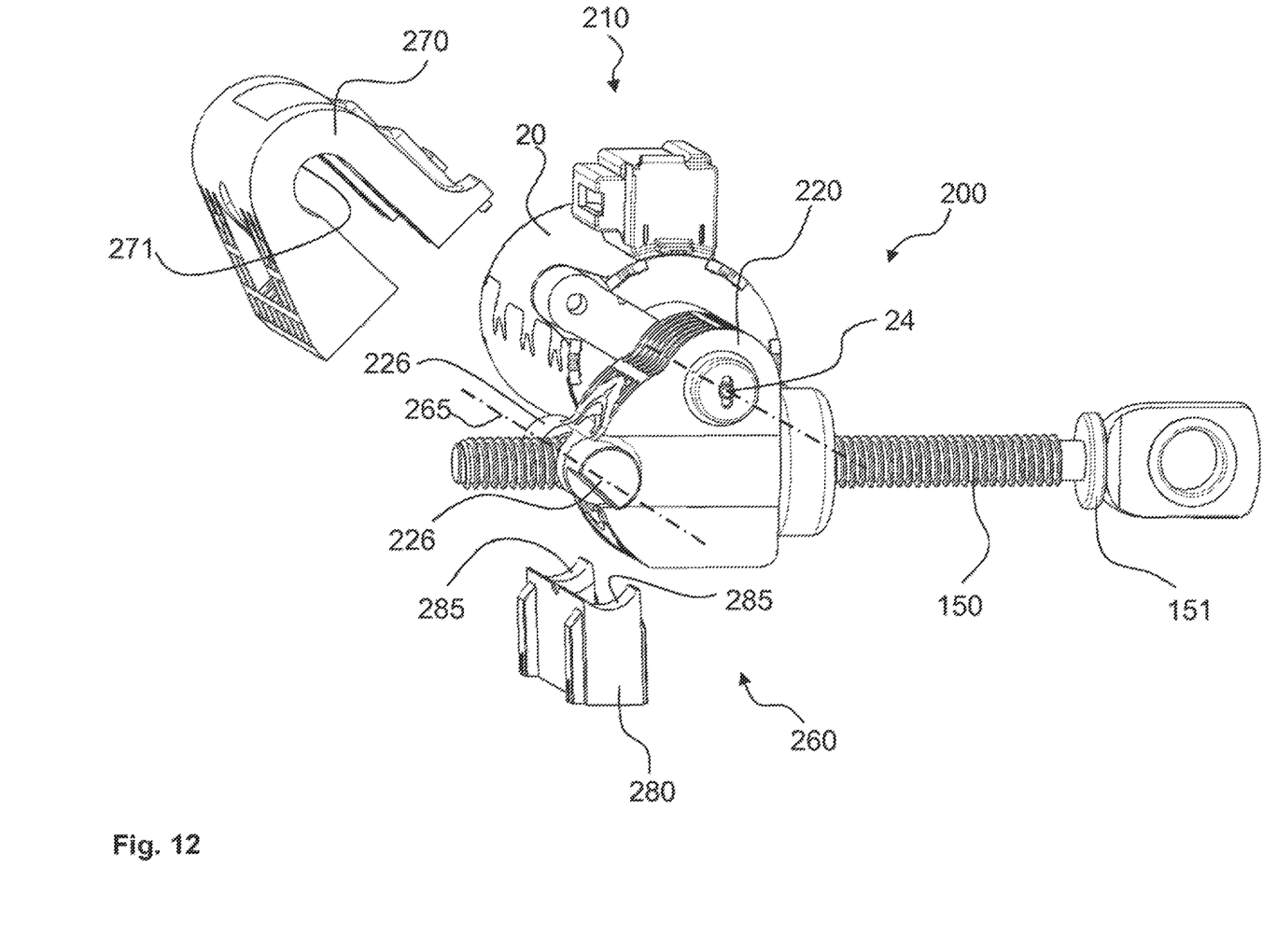
FIG. 12 is a view corresponding to FIG. 10 with an exploded view of the gear retention device of the second embodiment.

FIGS. 10 to 12 illustrate a second embodiment of an actuating drive 210. The actuating drive 210 comprises a gear mechanism 200 which differs from the gear mechanism 100 of the first embodiment as a result of a gear housing 220 which is modified in terms of individual details. A gear retention device 260 further differs from the gear retention device 160 of the first embodiment. Components of the actuating drive 210 which are modified with respect to the first embodiment have reference numerals increased by 100. Unless described otherwise below, the second embodiment corresponds to the first embodiment.

The actuating drive 210 comprises an electric motor 20 and the gear mechanism 200 which is connected to the electric motor 20 and whose gear housing 220 is supported by a gear retention device 260 pivotably about a pivot axis 265.

Two shaft portions 226, which project laterally from the gear housing 220 at both sides and perpendicularly to a spindle 150 which extends through the gear housing 220, are formed on the gear housing 220. The two shaft portions 226 define a pivot axis 265 about which the gear housing 220 can be pivoted relative to the gear retention device 260. The two shaft portions each have a circular cross-section which has a planar flattened portion at one location.

The gear retention device 260 comprises a curved retention member 270 and a closure member 280 which are connected, for example, clip-fitted, to each other and which receive the two shaft portions 226 of the gear housing 220 in a supporting manner between them.

The curved retention member 270 is constructed in the manner of a U-shaped curved member whose legs extend substantially perpendicularly to the spindle 150. In an inner region between the legs of the curved retention member 270 there is formed a first bearing shell 271 which extends over an angle of approximately 180° in a semi-circular manner about the pivot axis 265.

The closure member 280 also has a U-shaped basic form having two legs, wherein the legs of the closure member 280 extend substantially parallel with the spindle 150. Each of the two legs of the closure member 280 laterally has a second semi-cylindrical bearing shell 285.

The length of the legs of the closure member 280 corresponds to the spacing of the legs of the curved retention member 270. The legs of the curved retention member 270 receive the closure member 280 between them. The two semi-cylindrical second bearing shells 285 form, together with the first bearing shell 271 of the curved retention member 270, a peripheral projection which rotatably supports one of the two shaft portions 226 therein.

The curved retention member 270 has in the region of the leg ends a plurality of through-holes which are not illustrated in the figures. Those through-holes serve to fix the curved retention member 270 to a structural member, for example, a seat structure. The center axes of the fixing means each extend substantially perpendicularly to the spindle 150.

The output shaft 24 is completely arranged outside the gear retention device 260.

The features disclosed in the above description, the claims and the drawings may be significant both individually and in combination for the implementation of the invention in the various embodiments thereof.

While specific embodiments of the invention have been shown and described in detail to illustrate the application of the principles of the invention, it will be understood that the invention may be embodied otherwise without departing from such principles.

What is claimed is:

1. An actuating drive for a motor vehicle seat, the actuating drive comprising:
   an electric motor which has an output shaft;
   a gear mechanism which is connected to the output shaft and which has a gear housing; and
   a gear retention device which supports the gear housing pivotably about a pivot axis, the gear retention device comprising a closure member, wherein a shaft portion of the gear housing in alignment with the pivot axis is at least partially surrounded by a curved retention member of the gear retention device, and the output shaft is arranged outside the curved retention member and completely outside the gear retention device, the curved retention member having a first bearing shell, wherein the closure member has a second bearing shell and the first bearing shell and the second bearing shell complement each other to form a hub which supports the shaft portion, wherein the closure member closes the curved retention member such that the shaft portion is completely surrounded in a peripheral direction thereof by the gear retention device.

2. The actuating drive as claimed in claim 1, wherein the closure member comprises a spindle receiving opening, and wherein at least a portion of a spindle is arranged in the spindle receiving opening when the spindle is in an extended position.

3. The actuating drive as claimed in claim 1, further comprising:
   a spindle nut, which can be driven at least indirectly by the output shaft, rotatably supported in the gear housing and
   a spindle, wherein the spindle nut cooperates with the spindle such that a rotation of the spindle nut results in a relative displacement between the spindle and the gear housing.

4. The actuating drive as claimed in claim 3, further comprising an endless screw connected to the output shaft in a rotationally secure manner, the endless screw being in engagement with the spindle nut.

5. The actuating drive as claimed in claim 3, wherein in at least one end region of the spindle there is provided a spindle stop which projects radially from the spindle and which abuts an end face of the spindle nut in an end position of an adjustment range of the actuating drive and thereby defines the end position.

6. The actuating drive as claimed in claim 1, wherein the shaft portion at least partially adjoins a through-opening of the gear housing or partially projects therein, and the curved retention member extends through the through-opening, the output shaft being rotatable about an output shaft rotatable axis, the closure member extending parallel to the output shaft rotatable axis.

7. The actuating drive as claimed in claim 1, wherein the closure member is connected to the curved retention member by means of a clip-fit connection, the closure member being perpendicular to a spindle.

8. The actuating drive as claimed in claim 7, wherein the closure member is positive-lockingly connected to the curved retention member in a direction parallel with the pivot axis.

9. The actuating drive as claimed in claim 1, wherein the closure member is connected to the curved retention member in a positive-locking manner in a direction parallel with the pivot axis, wherein one portion of the curved retention member is in contact with one area of the closure member and another portion of the curved retention member is in contact with another area of the of the closure member, the one area of the closure member being located at a spaced location from the another area of the closure member.

10. The actuating drive as claimed in claim 1, wherein the gear retention device has at least one opening for the introduction of a fixing means, comprising a screw, for fixing the gear retention device to an additional component.

11. The actuating drive as claimed in claim 10, wherein a center axis of the fixing means, orientated in the longitudinal direction of the fixing means, extends substantially parallel with a spindle.

12. The actuating drive as claimed in claim 1, wherein the electric motor has a reduction gear and an output shaft of the reduction gear forms the output shaft of the electric motor.

13. The actuating drive as claimed in claim 1, wherein the actuating drive has precisely one electric motor.

14. The actuating drive as claimed in claim 1, wherein the closure member is connected to the curved retention member by a clip-fit connection, the closure member comprising an arcuate surface, the arcuate surface engaging at least a portion of the gear housing.

15. The actuating drive as claimed in claim 1, wherein the closure member is positive-lockingly connected to the curved retention member in a direction parallel with the pivot axis, the closure member comprising an arcuate surface, the arcuate surface engaging at least a portion of the gear housing.

16. The actuating drive as claimed in claim 1, wherein the pivot axis is parallel to the output shaft, the shaft portion comprising an outer curved peripheral surface facing in a direction of the curved retention member, the curved retention member comprising an inner curved retention member surface, the inner curved retention member surface completely surrounding the outer curved peripheral surface.

17. The actuating drive as claimed in claim 1, further comprising:
a spindle connected to the output shaft, the pivot axis being perpendicular to the spindle.

18. The actuating drive as claimed in claim 1, further comprising:
a spindle connected to the output shaft, the spindle comprising a spindle longitudinal axis, wherein the closure member extends from one side of the spindle to another side of the spindle in a direction traversing the spindle longitudinal axis.

19. An actuating drive for a motor vehicle seat, the actuating drive comprising:
an electric motor which has an output shaft;
a spindle connected to the output shaft;
a gear mechanism which is connected to the output shaft and which has a gear housing; and
a gear retention device which supports the gear housing pivotably about a pivot axis, the gear retention device comprising a curved retention member and a closure member, the curved retention member having a first bearing shell and the closure member having a second bearing shell, wherein a shaft portion of the gear housing in alignment with the pivot axis is at least partially surrounded by the curved retention member, and the output shaft is arranged outside the curved retention member and completely outside the gear retention device, the first bearing shell and the second bearing shell complementing each other to form a hub which supports the shaft portion, the closure member extending from one side of the spindle to another side of the spindle in a direction transverse to the spindle, the curved retention member comprising a curved retention member inner surface, the shaft portion being located adjacent to the curved retention member inner surface.

20. The actuating drive as claimed in claim 19, wherein the shaft portion comprises a curved outer peripheral surface arranged opposite the curved retention member inner surface, the curved retention member inner surface completely surrounding the curved outer peripheral surface.

\* \* \* \* \*